Figure 1:
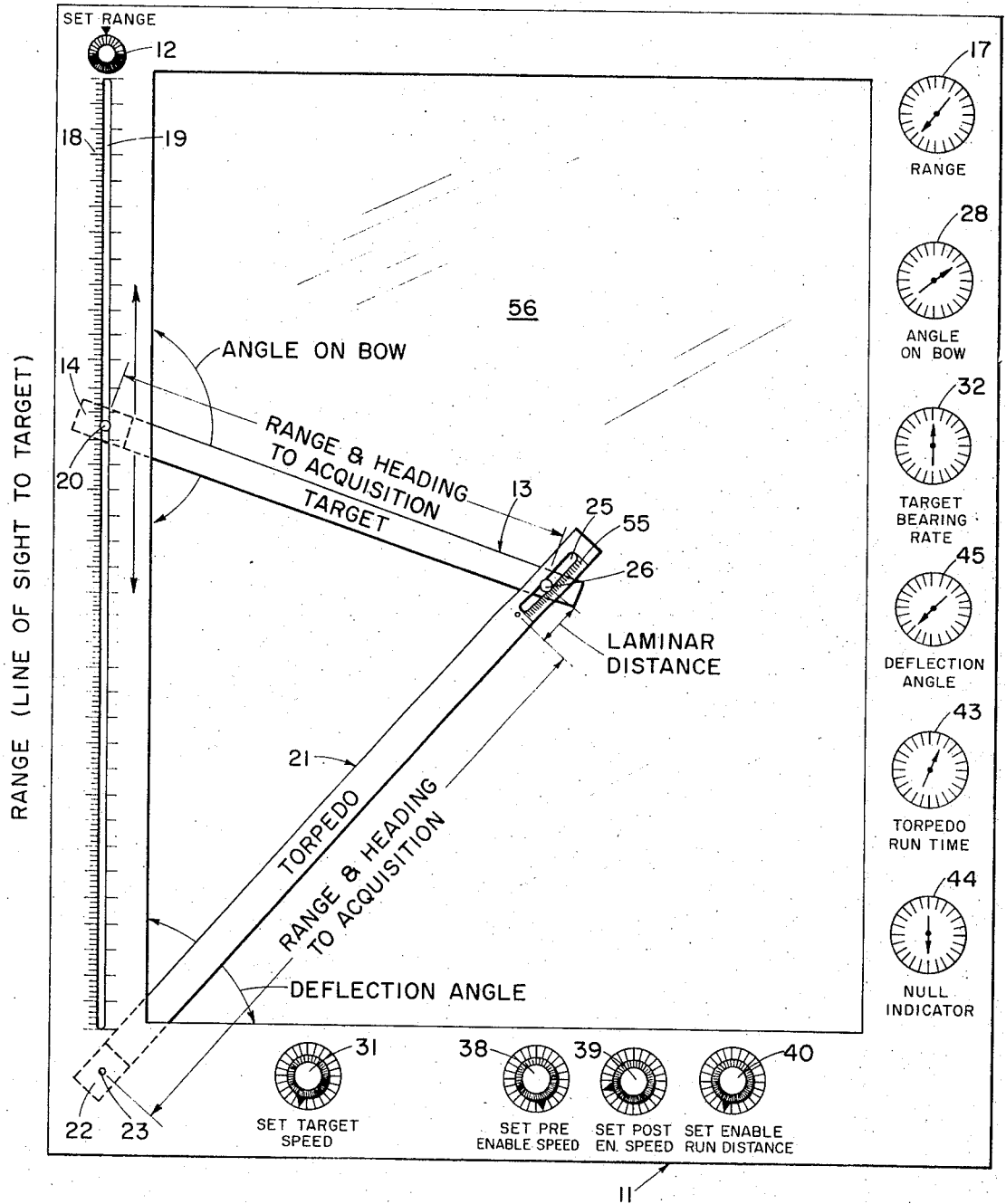

United States Patent
Headle, Jr.

[11] 3,860,791
[45] Jan. 14, 1975

[54] DEFLECTION ANGLE PLOTTER

[75] Inventor: Herbert W. Headle, Jr., Middleton, R.I.

[73] Assignee: The United States of America as represented by the Secretary of the Navy, Washington, D.C.

[22] Filed: Mar. 13, 1968

[21] Appl. No.: 714,167

[52] U.S. Cl. ........ 235/61.5 T, 235/61.5 R, 235/190, 235/150.27
[51] Int. Cl. .............................................. G06g 7/80
[58] Field of Search .... 235/186, 190, 150.2, 61.5 E, 235/61.5 T, 150.27, 197

[56] References Cited
UNITED STATES PATENTS
2,689,083  9/1954  Hammond .................... 235/150.26
3,402,286  9/1968  Mather .............................. 235/183

*Primary Examiner*—Maynard R. Wilbur
*Assistant Examiner*—H. A. Birmiel
*Attorney, Agent, or Firm*—R. S. Sciascia; C. E. Vautrain, Jr.

[57] ABSTRACT

A deflection angle plotter is provided which replaces the conventional set of plotting curves by a pair of rolled tapes both of which may be extended and retracted and are pivotable at their rolled end and pinned together at the other end. One tape is slotted near the end, this slot accommodates a pin mounted on the other tape. The tape carrying the pin is slidable along the ordinate of the plotter at its rolled end. Target range from own ship is introduced by displacement along the ordinate of the tape carrying the pin while the direction and amount of extension of that tape represents target course and distance to acquisition. Torpedo course and distance to acquisition are represented by the nonslidable tape. Inputs of target course, target range, target speed, torpedo pre-enable speed, torpedo post-enable speed and torpedo enable run distance into a plotter control circuit provide, through appropriate potentiometers and other conventional circuit components, meter readings of range, angle on the bow, target bearing rate, deflection angle and torpedo run time in the rapid solution of a plurality of problems each having a plurality of different parameters.

6 Claims, 2 Drawing Figures

DEFLECTION ANGLE PLOTTER

The invention described herein may be manufactured and used by or for the Government of the United States of America for governmental purposes without the payment of any royalties thereon or therefor.

This invention relates to means for determining torpedo settings and more particularly to a device which is capable of accepting any given set of target-torpedo parameters, including those for two-speed torpedoes having variable enable points.

Several guidance techniques are available for programming a weapon to hit a selected moving target. The three basic methods used are: computed intercept, bearing rider and pursuit modes. In the computed intercept mode, the target impact point is predicted, directly or indirectly, at the time the torpedo is launched. If the target data is well known, i.e. bearing, bearing rate, range, course and speed, and there is no maneuver, an intercept can be achieved with not further action by the personnel directing the operation. This is the case of the straight running torpedo fired on a preset gyro-controlled course. The addition of a homing system to the simple straight runner reduces the accuracy required in the initial determination of the intercept point. Of course, if a wire guidance link is available, the computed intercept course can be corrected at intervals during the run to take into account target maneuver or inaccuracies in the firing solution which may be refined during the torpedo run. In the bearing rider mode, the torpedo is kept on the bearing line between the homing ship and target. This is accomplished by steering commands transmitted to the torpedo by a wire guidance link, maintaining the dead-reckoned torpedo position on the target's sonar bearing. In the pursuit mode, the torpedo homes on sounds hopefully emanating from the target only.

Regardless of the firing method used, the torpedo is usually launched at some angle ahead of the target so as to intercept the target on its assumed course. This angle, called the deflection angle, is simply the lead angle. Where wire guidance is used, the deflection angle has been used to increase the probability of a hit, if torpedo control is lost during the launch. In the computed intercept mode, deflection angle has been included in the computation to establish the course the torpedo must run to intercept the target. Therefore, the major prior effort appears to have been to develop methods and equipment which will provide reasonably accurate deflection angles from limited amounts of data.

Some of the earlier efforts to determine deflection angles led to the generation of sets of curves. These curves or plots of range versus deflection angles used different target speeds and bearing rates. They were based on the equation which relates target speeds, $S_t$, target angle on the bow, AOB, target range, R, and target bearing rate, $\dot{B}$, as follows:

$$\dot{B} = KS_t \sin AOB/R \quad (1)$$

If this equation is coupled with the torpedo variables, i.e. torpedo speed, $S_o$, and deflection angle, $\psi$, then:

$$\sin \psi = \dot{B} R/K S_o = S_t \sin AOB/S_o \quad (2)$$

where
 K = 1936
 $\dot{B}$ is in degrees per minute
 R is in yards
 $S_o$ is in knots
 $S_t$ is in knots.

To increase the effectiveness of deflection angle curves, more information about the target must be included and combined to either make fewer, more easily read charts or to present the problem in a device where variables may be introduced to form a plurality of solutions on a single surface.

Curves for determining the deflection angle of a homing topedo based on a fixed target course and speed, a fixed torpedo speed and laminar point and a computed intercept path have been incorporated on a chart known as a "wet hen spread angle plotter". Although these charts can be used for any target variables, a new chart is required for each torpedo variable and for each different type of torpedo used.

The fire control problem of directing a torpedo to a point in space and time that will insure the greatest probability of acquiring a target thus has not been adequately solved by any of the previously used backup techniques. These methods have either been too complex, requiring extensive time in their use, or overly simplified so that much of the data obtained is lost or not used. The present deflection angle plotter has been devised to overcome the deficiencies of prior torpedo directing systems.

Based on the principles of both the deflection angle curves and the locus of interception, the present deflection angle plotter permits the following types of data to be inserted or extracted in the solution of a given problem: target speed, range, bearing rate, and angle on the bow; and torpedo speed, laminar point, enable point, time to intercept and deflection angle. The device is completely self-contained and can be used by a single operator who can have a visual chart of the position of the target and the torpedo before him at all times. If desired, the device may be wired directly to the torpedo command section of a fire control system for automatic control of a torpedo.

Accordingly, it is an object of the present invention to provide a deflection angle plotter that is capable of accepting all the data acquired on a target.

It is another object of the invention to provide a deflection angle plotter in which all the data acquired on a target, together with torpedo variables, may be presented to a fire control operator in such form that an easy and rapid solution is possible.

A still further object of the invention is to provide a deflection angle plotter which will present to a fire control operator a plurality of solutions to the fire control problem and will allow the operator to direct a torpedo or torpedoes to a point where acquisition to the target is assured.

Figure 2:
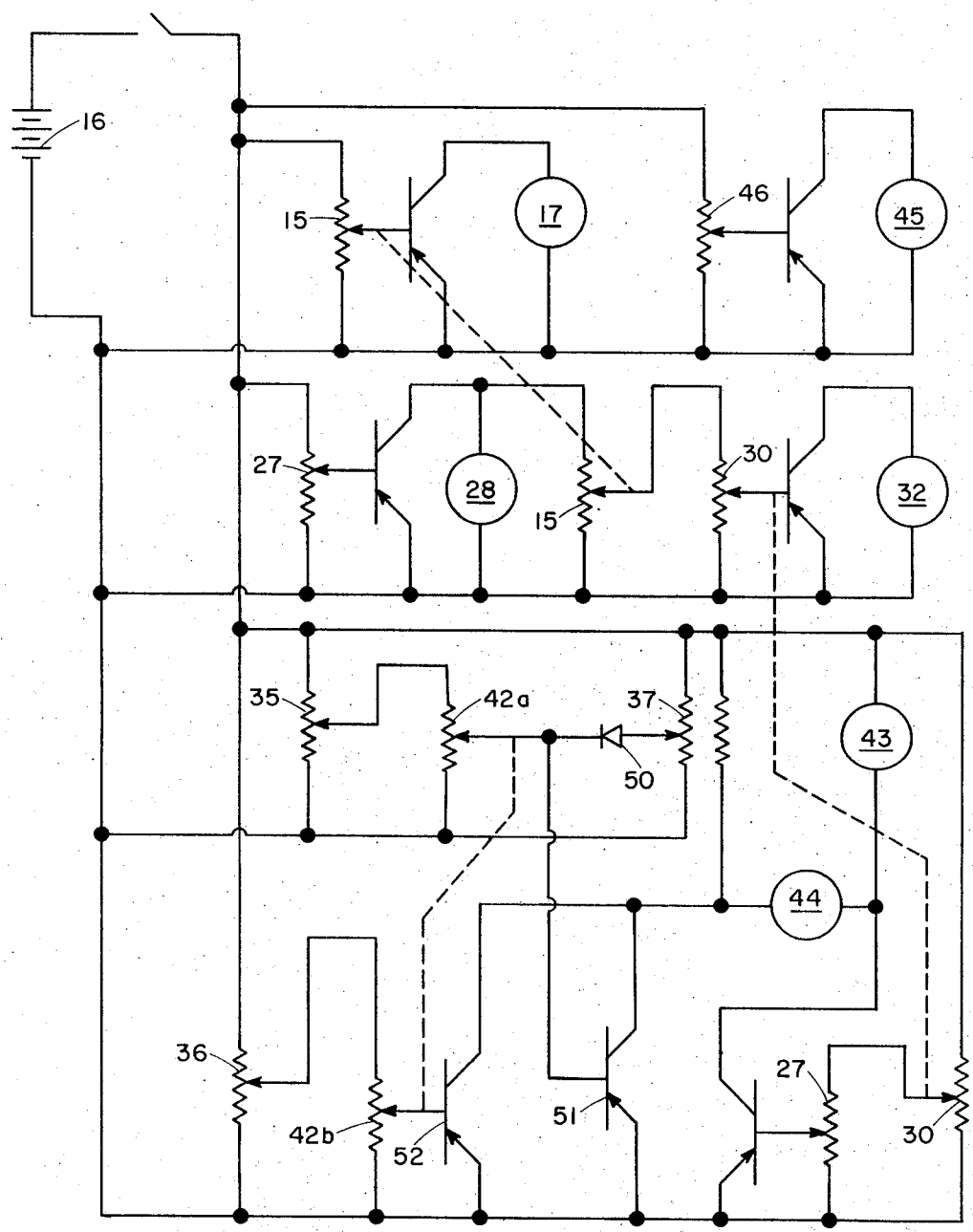

Other objects, advantages and novel features of the invention will become apparent from the following detailed description thereof when considered in conjunction with the accompanying drawings in which like numerals represent like parts throughout and wherein:

FIG. 1 is a schematic diagram of the deflection angle plotter showing the inputs to and outputs of the problem and the surface on which a solution is presented to the operator; and FIG. 2 is a schematic wiring diagram showing an operational circuit for use with the device of FIG. 1.

Referring to FIG. 1, the deflection angle plotter is shown in plan view, the actual device being incorporated in a box substantially 15 inches by 25 inches by 4 inches as indicated at 11. All electrical components, gears, etc. are included in the box, and the device may be operated on either battery power or external power. Referring to both FIGS. 1 and 2, a control knob 12 on the plotter controls the vertical movement along the plotter ordinate of one end of a tape arm 13 which preferably is made of thin metallic tape that can be easily pulled out or retracted on a spring-loaded drum on a carriage such as is indicated at 14. Knob 12, in addition to indicated range and providing for the physical movement of tape 13, also is coupled to a dual potentiometer 15 in a circuit which receives power from a power source such as battery 16. One branch of potentiometer 15 is connected to a meter 17 on which range is displayed, meter 17 presenting a duplicate reading of range to that which may be read directly on a vertical scale 18 which extends along the ordinate of the plotter. Tape 13 and coil 14 pivot about an axis transverse to the longitudinal dimension of the tape, the drum being adapted to be moved vertically along scale 18 by means not shown, guided therealong in a groove 19 by means of a pin mounted on the frame of the drum, also not shown. Tape 13 therefore is extensible in any direction at any length across the surface of the plotter and may be easily rotated to represent in its final position the target course and distance to target acquisition.

A second tape 21 is mounted in a frame at the lower left corner of the plotter, not shown, and is collected on and fed from a drum 22 which is pivotable with the frame about a pin 23 received in the upper surface of the plotter. Tape 21 is extensible also in all directions and at any length across the surface of the plotter and at its remote end is provided with a slot 25 adapted to receive a pin 26 mounted near the corresponding end of tape 13.

The other portion of dual potentiometer 15 is used in conjunction with a dual potentiometer 27 coupled to tape 13 at coil 14 to provide an input for its angular position about pin 20 to indicate the angle on the bow of the target. This indication is displayed on a meter 28 which is disposed along the right margin of the plotter. A second range setting dual potentiometer 30 is connected to a knob 31 with associated dial through which target speed may be set into the circuit. The resulting combination of potentiometers 15, 27 and 30 Yields target bearing rate which parameter is indicated by a meter 32. Three additional potentiometers, 35, 36 and 37, are used to set, respectively, torpedo pre-enable speed by a knob 38, post-enable speed by a knob 39 and the enable run distance of the torpedo by a knob 40. These potentiometers and an additional dual potentiometer 42a and 42b, coupled to tape 21 to indicate the torpedo range to acquisition of the target, are interconnected to yield torpedo run time which is indicated on a meter 43, while the potentiometers for target speed, 30, and for the amount of tape 13 which is extended across the plotter are combined to produce target run time. Torpedo run time and target run time then are compared on a null meter 44 which when indicating zero informs the operator that the solution to the problem has been reached. When a null is indicated on meter 44, the angular position of tape 21 indicates the deflection angle, or lead angle, on a meter 45. Rotation of tape 21 is introduced through a potentiometer 46.

Each of the potentiometers is connected to its respective meter or meters through a transistor to reduce the loading effects. The diode 50 and transistors 51 and 52 form the variable enable run distance circuit for two-speed torpedoes. The voltage on the arm of the dual potentiometer 42a is allowed to increase until it is equal to the voltage on the arm of potentiometer 37. The voltage then can no longer increase as it is clamped by the diode 50 to the voltage on the arm of potentiometer 37. The voltage on the arm of the dual potentiometer 42b will continue to increase as the dual potentiometer 42a and 42b is further increased. These voltages are summed by transistors 51 and 52. A higher voltage change per turn of the dual potentiometer 42a and 42b will result at meter 44 below the clamping level set by potentiometer 37. A lower voltage change per turn of the dual potentiometer 42a and 42b will result at meter 44 above the clamping level. These voltage changes correspond to the pre-enable and post-enable torpedo speeds respectively.

In operation, the pin 26 is set in slot 25 at a position along a scale 55 which represents the laminar distance of the torpedo. Next, the torpedo pre-enable speed and post-enable speed are set at potentiometers 38 and 39, respectively. By adjusting the target range, knob 12, target speed, knob 31, and target angle on the bow, meter 28, the correct target bearing rate will be indicated by meter 32. Different values of target range, speed and angle on the bow can be inserted to cover all possible targets, with the different solutions marked as desired on the surface 56 of the plotter. Keeping the target range, speed, course and bearing fixed, pin 26 is moved about the surface 56 until null indicated 44 reads zero. If required, changes in the enable point are entered through the enable run distance knob 40 to obtain a zero reading. When meter 44 indicates zero, the position of pin 26 indicates the point in space where the torpedo should acquire the target. Meter 43 indicates the run time of the torpedo to this point while deflection angle meter 45 indicates the deflection angle, or lead angle, required of the torpedo, and the dial associated with the enable run distance knob 40 indicates the enable distance of the torpedo from torpedo launch.

The deflection angle plotter provided is based on the principles of both the deflection angle curves and the locus of interception. The following types of data may be inserted in or extracted from the device: target speed, range, bearing rate, and angle on the bow; and torpedo speed, laminar point, enable point, time to acquisition and deflection angle. The plotter is self-contained and may be used by a single operator who can have a visual chart of the position of the target and the torpedo before him at all times. If desired, the device could be wired directly to the torpedo command section of a fire control system for automatic control. When the null indicator reads zero, the problem is solved and the readings on all the meters may be used to provide the correct settings for the torpedo. If the target is out of range, or some nearby object might void the torpedo homing system, a new set of variables may be inserted in the plotter and a different solution obtained. Where the target is not well defined in one or more aspects, i.e. speed is known only within certain limits, the operator may set the approximate maximum and then minimum speeds in the plotter and obtain two solutions. By indicating the points so obtained on the working surface of the plotter with a grease pencil, the operator can compute the number of torpedoes required to insure the probability of a hit. In the event the reading on the time meter exceeds a given value, acquisition will not be possible with that torpedo.

The present invention can also be used to solve for some of the target unknown parameters. For example, if target speed and bearing rate are known, the range and angle on the bow can be changed to show the family of values that the target must have.

The deflection angle plotter of the present invention provides a true geographic plot of the target and torpedo and can be used with any torpedo without changing charts or parts and, in addition, can accept any combinations of input data. Although the embodiment described uses dc power, it will be appreciated that one using ac power may be made within the scope of the invention and that such an embodiment would operate at a higher power level which would permit direct coupling to other equipment aboard ship.

Own ship motion is another function that may be added to the plotter. Further, any type of torpedo attack, e.g. snake search over a long strip area represented by the width of tape 21 or a fast transportation speed followed by a drop for a circle search, may be computed. The device additionally can be used with two-speed torpedoes as well as single speed torpedoes. It indicates directly total torpedo run time, and different laminar points may be used for the same or different torpedoes. The tape arms 13 and 21 may be virtually any size and made of a variety of materials but should be such that when moved in the horizontal plane they cause drums 14 and 22 to turn by the same amount.

Obviously many modifications and variations of the present invention are possible in the light of the above teachings.

What is claimed is:

1. A device for rapidly solving a plurality of relative motion problems each having a plurality of parameters by vector triangle comprising:
   a plotter surface including a frame for accommodating a plurality of electrical controls and indicators;
   at least a pair of pivotable and extensible arms mounted adjacent said plotter surface and forming two sides of said triangle for introducing direction and distance parameters into the device;
   a portion of one edge of said surface forming the third side of said triangle;
   circuit means connected to said arms for converting said parameters into electrical signals;
   said electrical controls including means for introducing speed and distance parameters into said circuit means;
   the vertex formed by the first and second sides of said triangle being movable omnidirectionally to form a multiplicity of relative motion triangles; and
   means for energizing said circuit means,
   said circuit means adapted to combine said data inputs to obtain a substantially instantaneous solution of a problem and to provide an indication thereof and of torpedo and target parameters coinciding to form said solution.

2. A device as defined in claim 1 wherein said frame means includes coordinates defining two adjacent boundaries of said plotter surface;
   at least one of said boundaries having distance indicating means associated therewith;
   said distance indicating means extending along the third side of said triangle;
   said third side of said triangle variable in length.

3. A device as defined in claim 2 wherein one of said two sides of said triangle is extensible and rotatable to indicate target angle on the bow and distance to acquisition and the other of said two sides is extensible and rotatable to indicate torpedo deflection angle and run to acquisition;
   said circuit means including target input means for introducing inputs of estimated target range, estimated target speed and angle on the bow and torpedo input means for introducing inputs of laminar distance, pre-enable speed and post-enable speed;
   said circuit means providing outputs of target bearing rate, torpedo deflection angle and torpedo run time to target acquisition.

4. A device as defined in claim 3 wherein said arms are of rolled material to facilitate extension and shortening, the rolls pivotable to accommodate directional changes; and
   means connected to the axis of rotation of said rolls and said circuit means to introduce distance parameters into said circuit means and to the pivot axis and said circuit means to introduce direction parameters into said circuit means.

5. A device as defined in claim 4 wherein said circuit means includes means combining inputs of target range, target speed and angle on the bow to provide a target bearing rate output;
   said circuit means further including means for combining inputs of laminar distance, pre-enable speed and post-enable speed to provide outputs of torpedo deflection angle and torpedo run time to target acquisition.

6. A device as defined in claim 5 wherein said circuit means includes means for combining torpedo run time to acquisition and target run time to acquisition so as to display a positive indication of the condition wherein said run times are equal,
   said condition produced by the omnidirectional movement of the vertex formed by the first and second sides of said triangle.

* * * * *